United States Patent
Ghannam et al.

(10) Patent No.: US 10,647,173 B2
(45) Date of Patent: May 12, 2020

(54) VEHICLE SENSOR TEMPERATURE CONTROL

(71) Applicant: Ford Global Technologies, LLC, Dearborn, MI (US)

(72) Inventors: Mahmoud Yousef Ghannam, Canton, MI (US); Aed M. Dudar, Canton, MI (US); Venkatesh Krishnan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 251 days.

(21) Appl. No.: 15/864,659

(22) Filed: Jan. 8, 2018

(65) Prior Publication Data

US 2019/0210423 A1    Jul. 11, 2019

(51) Int. Cl.
*B60H 1/00* (2006.01)
*B60H 1/24* (2006.01)
*G01S 17/931* (2020.01)

(52) U.S. Cl.
CPC ..... *B60H 1/00271* (2013.01); *B60H 1/00735* (2013.01); *B60H 1/00742* (2013.01); *B60H 1/00835* (2013.01); *B60H 1/245* (2013.01); *B60H 1/248* (2013.01); *B60H 2001/003* (2013.01); *G01S 17/931* (2020.01)

(58) Field of Classification Search
CPC .................................................. B60H 1/00271
USPC .................................. 454/75, 184, 136–138
See application file for complete search history.

(56) References Cited

U.S. PATENT DOCUMENTS

| 5,490,572 | A | * | 2/1996 | Tajiri | B60H 1/00278 |
|---|---|---|---|---|---|
| | | | | | 180/65.1 |
| 8,966,913 | B2 | | 3/2015 | Oh et al. | |
| 10,131,201 | B1 | * | 11/2018 | Yeomans | B60H 1/00821 |
| 2014/0036079 | A1 | | 2/2014 | Lang et al. | |
| 2016/0119509 | A1 | | 4/2016 | Wato | |
| 2017/0261273 | A1 | | 9/2017 | Maranville et al. | |

FOREIGN PATENT DOCUMENTS

| CN | 206133718 U | 4/2017 |
|---|---|---|
| DE | 102012110584 A1 | 6/2014 |

* cited by examiner

*Primary Examiner* — Vivek K Shirsat
(74) *Attorney, Agent, or Firm* — Frank A. MacKenzie; Bejin Bieneman PLC

(57) ABSTRACT

A vehicle includes an exterior surface, a sensor disposed on the exterior surface, a passenger cabin fixed relative to the exterior surface, a duct receiving airflow from the passenger cabin, and a valve disposed in the duct and movable between a first position directing the airflow to the sensor and a second position directing the airflow outside the vehicle.

19 Claims, 4 Drawing Sheets

VEHICLE SENSOR TEMPERATURE CONTROL

BACKGROUND

Autonomous vehicles include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices. Sensor operation can be affected by temperature, e.g., a sensor that is too hot may not operate properly.

DETAILED DESCRIPTION

Figure 1:
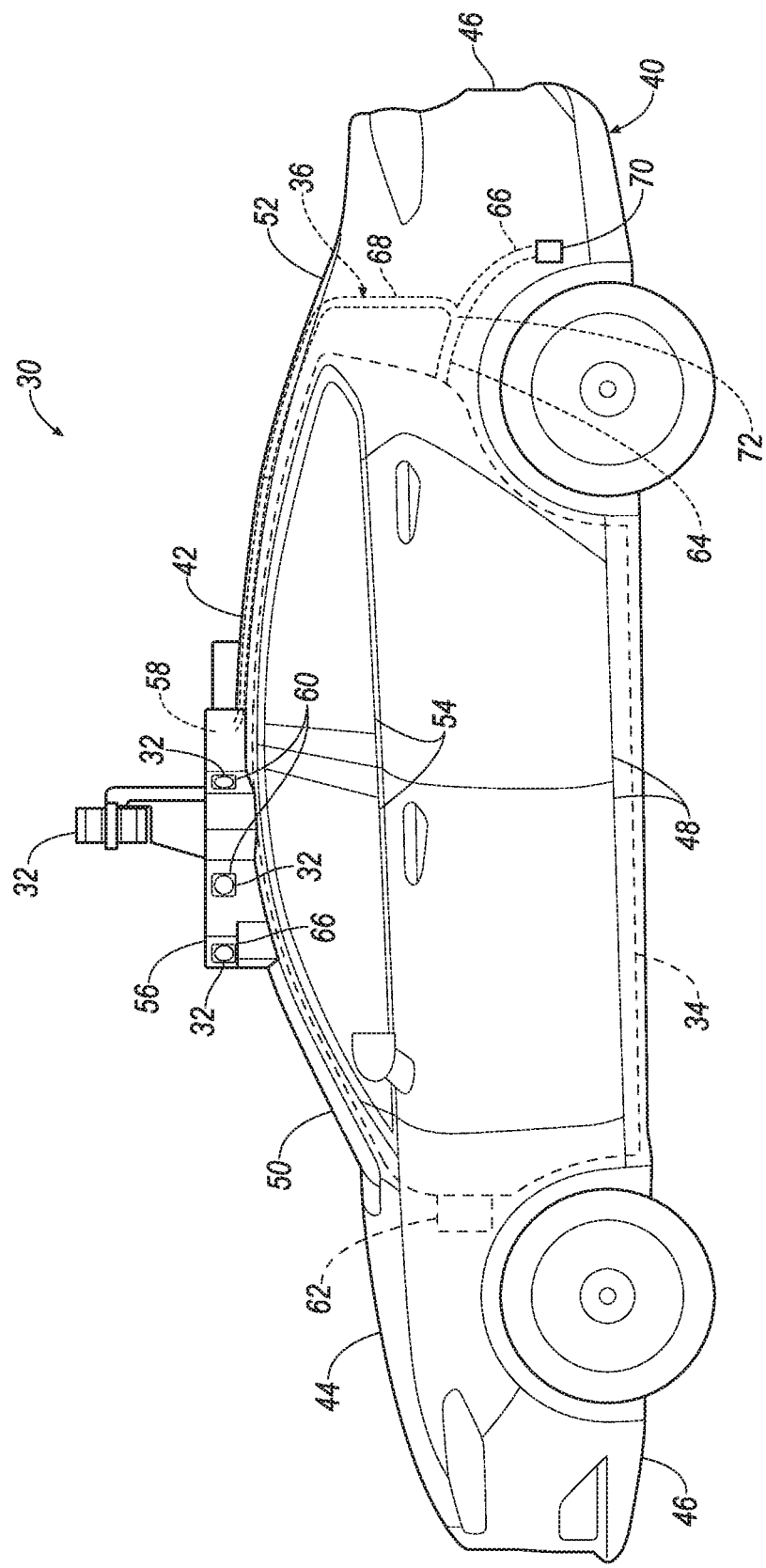
FIG. 1 is a side view of an example vehicle with a cooling system for a sensor.

A vehicle includes an exterior surface, a sensor disposed on the exterior surface, a passenger cabin fixed relative to the exterior surface, a duct receiving airflow from the passenger cabin, and a valve disposed in the duct and movable between a first position directing the airflow to the sensor and a second position directing the airflow outside the vehicle.

The exterior surface may be a roof. The vehicle may further include a housing attached to the roof, and the housing may define a chamber, and the sensor may be disposed in the chamber. The duct may extend from the valve to the chamber.

The vehicle may further include an actuator movingly coupled to the valve, and a controller communicatively connected to the actuator. The controller may be programmed to instruct the actuator to move the valve to the first position upon determining that a temperature of the sensor is one of above and below a temperature threshold. The controller may be programmed to instruct the actuator to move the valve to the second position upon determining that the temperature of the sensor is the other of above and below the temperature threshold.

The controller may be programmed to instruct the actuator to move the valve to the first position upon determining that a temperature of the sensor is outside a temperature range. The controller may be programmed to instruct the actuator to move the valve to the second position upon determining that a temperature of the sensor is inside the temperature range.

The controller may be programmed to instruct the actuator to move the valve to the first position upon determining that a temperature of the sensor is one of above and below a temperature threshold and that a pressure of the passenger cabin is above a pressure threshold.

The controller may be programmed to instruct the actuator to move the valve to the first position upon determining that a temperature of the sensor is one of above and below a temperature threshold and that an ignition of the vehicle is off.

The controller may be programmed to instruct the actuator to move the valve to the first position upon determining that a temperature of the sensor is one of above and below a temperature threshold and that the passenger cabin is unoccupied.

A controller includes a processor. The processor is programmed to instruct an actuator to move a valve of a vehicle to a first position upon determining that a temperature of a sensor is one of above and below a temperature threshold, and the sensor is disposed on an exterior surface of the vehicle, and the valve is movable between the first position directing airflow from a passenger cabin of the vehicle to the sensor and a second position directing the airflow outside the vehicle.

The controller may be programmed to instruct the actuator to move the valve to the second position upon determining that the temperature of the sensor is the other of above and below the temperature threshold.

The temperature threshold may be a first temperature threshold, the controller may be programmed to instruct the actuator to move the valve to the first position upon determining that the temperature of the sensor is above the first temperature threshold and to instruct the actuator to move the valve to the first position upon determining that the temperature of the sensor is below a second temperature threshold, and the first temperature threshold is higher than the second temperature threshold. The controller may be programmed to instruct the actuator to move the valve to the second position upon determining that the temperature of the sensor is below the first threshold temperature and above the second threshold temperature.

The controller may be programmed to instruct the actuator to move the valve to the first position upon determining that the temperature of the sensor is one of above and below the temperature threshold and that a pressure of the passenger cabin is above a pressure threshold.

The controller may be programmed to instruct the actuator to move the valve to the first position upon determining that the temperature of the sensor is one of above and below the temperature threshold and that an ignition of the vehicle is off.

The controller may be programmed to instruct the actuator to move the valve to the first position upon determining that the temperature of the sensor is one of above and below the temperature threshold and that the passenger cabin is unoccupied.

A method includes instructing an actuator to move a valve of a vehicle to a first position upon determining that a temperature of a sensor is one of above and below a temperature threshold, and the sensor is disposed on an exterior surface of the vehicle, and the valve is movable between the first position directing airflow from a passenger cabin of the vehicle to the sensor and a second position directing the airflow outside the vehicle.

Figure 2:
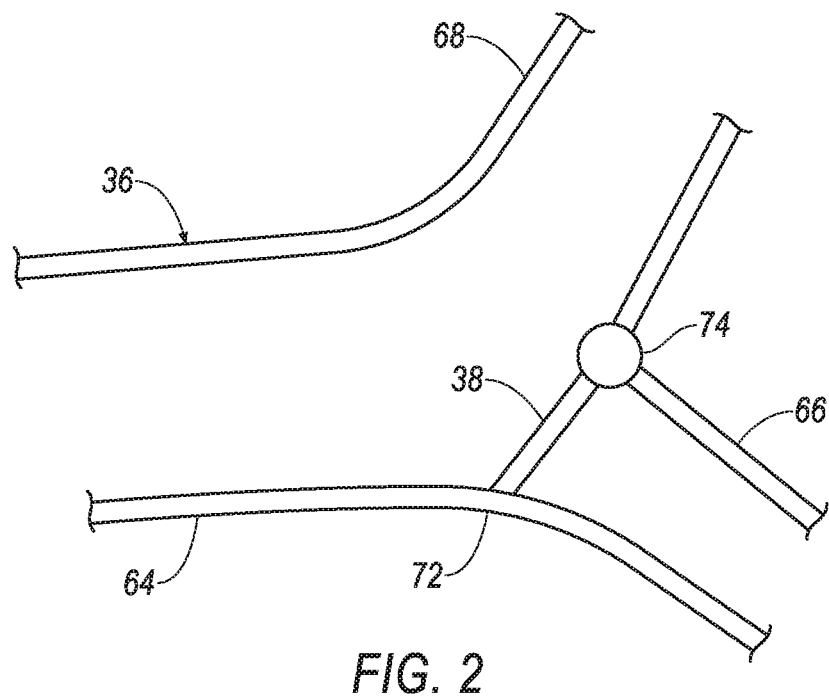
FIG. 2 is a cross-sectional view of a portion of a duct of the cooling system of FIG. 1 with a valve in a first position.
Figure 3:
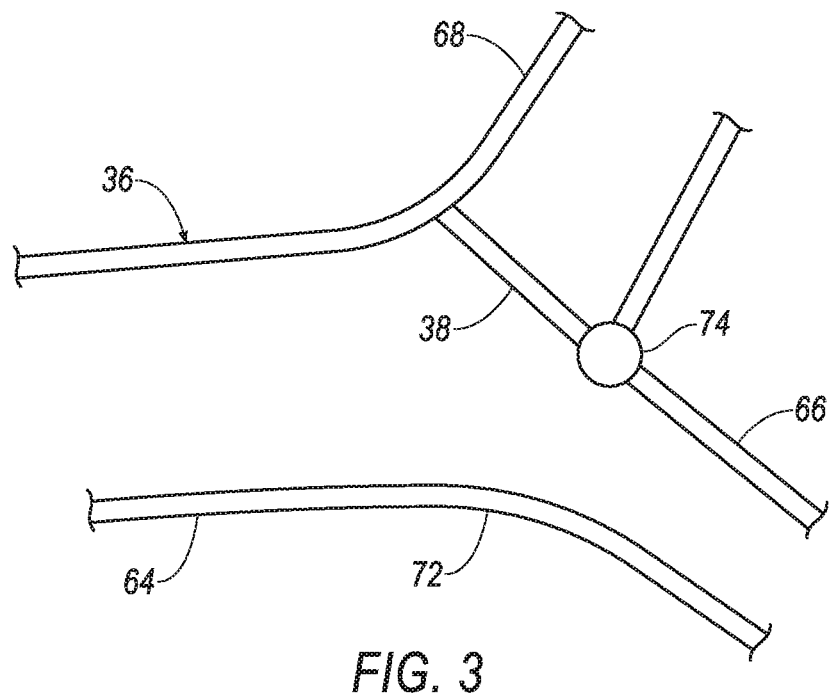
FIG. 3 is a cross-sectional view of the portion of the duct of the cooling system of FIG. 1 with the valve in a second position.

With reference to FIGS. 1-3, an example vehicle 30 includes exterior surfaces 42, 44, 46, 48, 50, 52, 54, a sensor 32 disposed on one of the exterior surfaces 42, 44, 46, 48, 50, 52, 54, a passenger cabin 34 fixed relative to the exterior surface 42, 44, 46, 48, 50, 52, 54, a duct 36 receiving airflow from the passenger cabin 34, and a valve 38 disposed in the duct 36 and movable between a first position directing the airflow to the sensor 32 and a second position directing the airflow outside the vehicle 30.

The vehicle 30 conserves energy by recapturing waste energy, specifically air in the passenger cabin 34 that has been heated to a temperature warmer than the ambient temperature or cooled to a temperature cooler than the ambient temperature. Waste air from the passenger cabin 34 can be routed to the sensor 32 as needed to heat or cool the sensor 32, as appropriate, or the waste air can be exhausted from the vehicle 30. The vehicle 30 can increase airflow to heat or cool the sensor 32 after occupants leave the vehicle 30.

With reference to FIG. 1, the vehicle 30 may be an autonomous vehicle. A computer can be configured to operate the vehicle 30 independently of the intervention of a human driver, completely or to a lesser degree. The computer may be programmed to operate the propulsion, brake system, steering, and/or other vehicle systems. For the purposes of this disclosure, autonomous operation means the computer controls the propulsion, brake system, and steering; semi-autonomous operation means the computer controls one or two of the propulsion, brake system, and steering and a human driver controls the remainder; and nonautonomous operation means the human driver controls the propulsion, brake system, and steering.

The vehicle 30 includes a body 40. The vehicle 30 may be of a unibody construction, in which a frame and the body 40 of the vehicle 30 are a single component, as shown in FIG. 1. The vehicle 30 may, alternatively, be of a body-on-frame construction, in which a frame (not shown) supports a body 40 that is a separate component from the frame. The frame and the body 40 may be formed of any suitable material, for example, steel, aluminum, etc.

The body 40 includes body panels 42, 44, 46 partially defining an exterior of the vehicle 30. The body panels 42, 44, 46 may present a class-A surface, e.g., a finished surface exposed to view by a customer and free of unaesthetic blemishes and defects. The body panels 42, 44, 46 include, e.g., a roof 42, a hood 44, etc. Doors 48 may be movably mounted to the body 40.

The body 40 supports windows 50, 52, 54, including, e.g., a windshield 50, a backlite 52, and side windows 54. The windows 50, 52, 54 may be formed of any suitably durable transparent material, including glass such as laminated, tempered glass or plastic such as Plexiglas® or polycarbonate.

For the purposes of this disclosure, an "exterior surface" of the vehicle 30 is a surface disposed on an outside of the vehicle 30 and facing away from the vehicle 30. For example, the body panels 42, 44, 46 and the windows 50, 52, 54 are exterior surfaces 42, 44, 46, 48, 50, 52, 54. The roof 42 is one of the exterior surfaces 42, 44, 46, 48, 50, 52, 54.

A housing 56 for the sensor 32 may be attached to one of the exterior surfaces 42, 44, 46, 48, 50, 52, 54. For example, the housing 56 may be attached to the roof 42, which can provide the sensor 32 with an unobstructed field of view of an area around the vehicle 30. The housing 56 may enclose and define a chamber 58; for example, the housing 56 may define a top and sides of the chamber 58. The exterior surface 42, 44, 46, 48, 50, 52, 54, e.g., the roof 42, may partially define the chamber 58, or the housing 56 may define a bottom of the chamber 58 as well as a top of the chamber 58. The housing 56 may shield contents of the chamber 58 from external elements such as wind, rain, debris, etc. The housing 56 may be formed of, e.g., plastic or metal.

The vehicle 30 includes sensors 32. The sensors 32 may detect the location and/or orientation of the vehicle 30. For example, the sensors 32 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 32 may detect the external world, e.g., objects and/or characteristics of surroundings of the vehicle 30, such as other vehicles, road lane markings, traffic lights and/or signs, pedestrians, etc. For example, the sensors 32 may include radar sensors, scanning laser range finders, light detection and ranging (LIDAR) devices, and image processing sensors such as cameras. The sensors 32 may include communications devices, for example, vehicle-to-infrastructure (V2I) or vehicle-to-vehicle (V2V) devices.

At least one of the sensors 32 is disposed on one of the exterior surfaces 42, 44, 46, 48, 50, 52, 54, e.g., the roof 42. The sensor 32 may be attached directly to the roof 42, or the sensor 32 may be attached to the housing 56, which in turn is directly attached to the roof 42. The sensor 32 is disposed inside the housing 56, i.e., in the chamber 58. The housing 56 may have one or more openings 60, and the sensor 32 may have a field of view through the opening.

The vehicle 30 includes the passenger cabin 34 to house occupants, if any, of the vehicle 30. The passenger cabin 34 includes one or more front seats disposed at a front of the passenger cabin 34 and one or more back seats disposed behind the front seats (not shown). The passenger cabin 34 is disposed within the body 40. The passenger cabin 34 is fixed relative to at least some of the exterior surfaces 42, 44, 46, 48, 50, 52, 54, e.g., the roof 42, the hood 44, the windshield 50, the backlite 52, etc.

A climate-control system 62 provides heating and/or cooling to the passenger cabin 34 of the vehicle 30. The climate-control system 62 may include a compressor, a condenser, a receiver-dryer, a thermal-expansion valve, an evaporator, blowers, fans, ducts, vents, vanes, temperature sensors 80, and other components that are known for heating or cooling vehicle interiors. The climate-control system 62 may operate to cool the passenger cabin 34 by transporting a refrigerant through a heat cycle to absorb heat from the passenger cabin 34 and expel the heat from the vehicle 30, as is known. The climate-control system 62 may include a heater core that operates as a radiator for an engine of the vehicle 30 by transferring some waste heat from the engine into the passenger cabin 34, as is known. The climate-control system 62 may include an electrically powered heater such as a resistive heater, positive-temperature-coefficient heater, electrically power heat pump, etc.

The duct 36 receives airflow from the passenger cabin 34. The duct 36 may have a tubular shape permitting the passage of air. The duct 36 includes an inlet branch 64 receiving the airflow from the passenger cabin 34, an outside-outlet branch 66, and a sensor-outlet branch 68. The outside-outlet branch 66 extends from the inlet branch 64 and fluidly connects to outside the vehicle 30, e.g., to an exhaust vent 70 permitting airflow out of the vehicle 30. The sensor-outlet branch 68 extends from the inlet branch 64 to the chamber 58. The inlet branch 64 is connected to the outside-outlet branch 66 and to the sensor-outlet branch 68 at a fork 72.

With reference to FIGS. 2 and 3, the valve 38 is disposed in the duct 36. For example, the valve 38 may be disposed at the fork 72. The valve 38 is movable between a first position directing airflow to the sensor 32 and a second position directing airflow outside the vehicle 30. The valve 38 in the first position may cover the outside-outlet branch 66 and leave open the sensor-outlet branch 68, i.e., obstruct airflow from the inlet branch 64 to the outside-outlet branch 66 and permit airflow from the inlet branch 64 to the sensor-outlet branch 68. The valve 38 in the second position may cover the sensor-outlet branch and leave open the outside-outlet branch 66, i.e., obstruct airflow from the inlet branch 64 to the sensor-outlet branch 68 and permit airflow from the inlet branch 64 to the outside-outlet branch 66. The valve 38 may be movable to other positions than the first and second positions. For example, the valve 38 may be rotatable between the first and second position, as shown in FIGS. 2 and 3. Alternatively, the valve 38 may be slidable between the first and second positions or may be movable in some other manner between the first and second positions.

An actuator 74 is coupled to the valve 38, and arranged to move the valve 38 between the first and second positions. The actuator 74 may be any type producing the dimension or direction of motion along which the valve 38 is movable, e.g., an electric motor, a piezoelectric actuator, a servomechanism, a solenoid, a stepper motor, etc.

Figure 4:
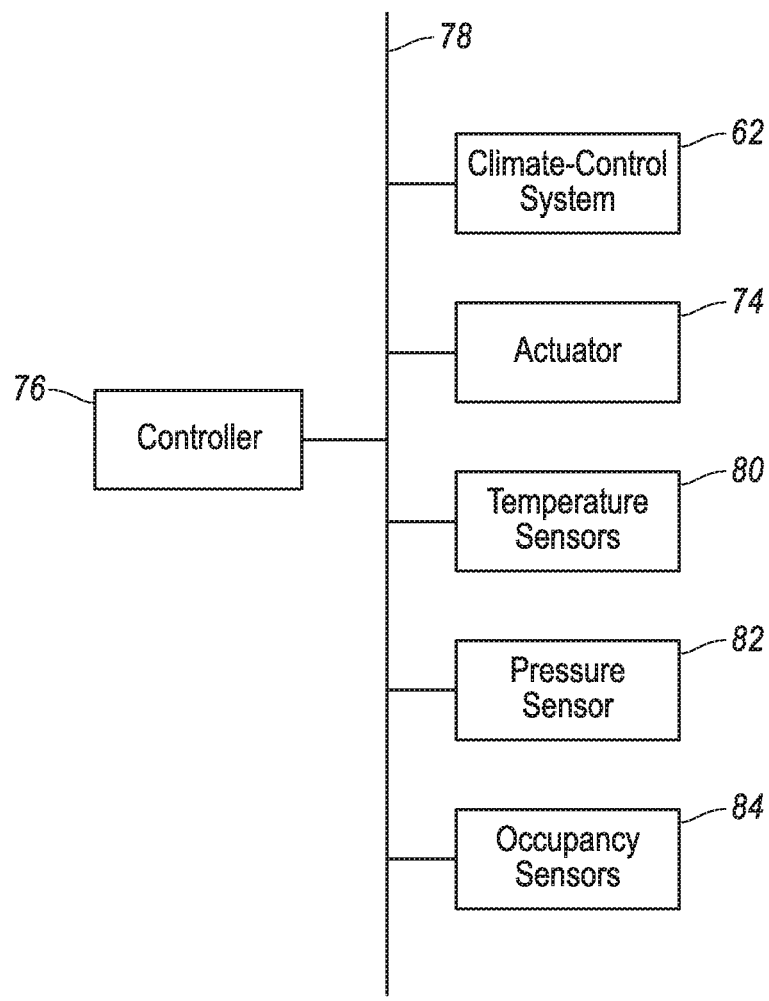
FIG. 4 is a block diagram of a control system for the cooling system of FIG. 1.

With reference to FIG. 4, the vehicle 30 includes a controller 76. The controller 76 is a microprocessor-based controller, i.e., a computing device. The controller 76 includes a processor, memory, etc. The memory of the controller 76 includes memory for storing instructions executable by the processor as well as for electronically storing data and/or databases. The controller 76 may be the same computer as is used for autonomously or semi-autonomously operating the vehicle 30, or may be separate.

The controller 76 may transmit and receive data through a communications network 78 such as a controller area network (CAN) bus, Ethernet, WiFi, Local Interconnect Network (LIN), onboard diagnostics connector (OBD-II), and/or by any other wired or wireless communications network. The controller 76 may be communicatively connected to the climate-control system 62, the actuator 74, the temperature sensors 80, a pressure sensor 82, occupancy sensors 84, and other components via the communications network 78.

Each temperature sensor 80 detects a temperature of a surrounding environment or an object in contact with the temperature sensor 80. The temperature sensor 80 may be any device that generates an output correlated with temperature, e.g., a thermometer, a bimetallic strip, a thermistor, a thermocouple, a resistance thermometer, a silicon bandgap temperature sensor, etc. The temperature sensors 80 are disposed in, e.g., the passenger cabin 34, the chamber 58, etc. The temperature sensor 80 in the chamber 58 may be in contact with one of the sensors 32.

The pressure sensor 82 may be disposed in the passenger cabin 34 and positioned to measure an atmospheric pressure inside the passenger cabin 34. The pressure sensor 82 may be any type able to detect pressures in a range typically found in the passenger cabin 34, e.g., piezoresistive strain gauge, capacitive diaphragm, electromagnetic diaphragm, piezoelectric, optical fiber, potentiometric, resonant, thermal, ionization, etc.

The occupancy sensors 84 are configured to detect occupancy of the seats. The occupancy sensors 84 may be visible-light or infrared cameras directed at the seats, weight sensors inside the seats, sensors detecting whether seatbelts for the seats are buckled or unspooled, or other suitable sensors.

Figure 5:
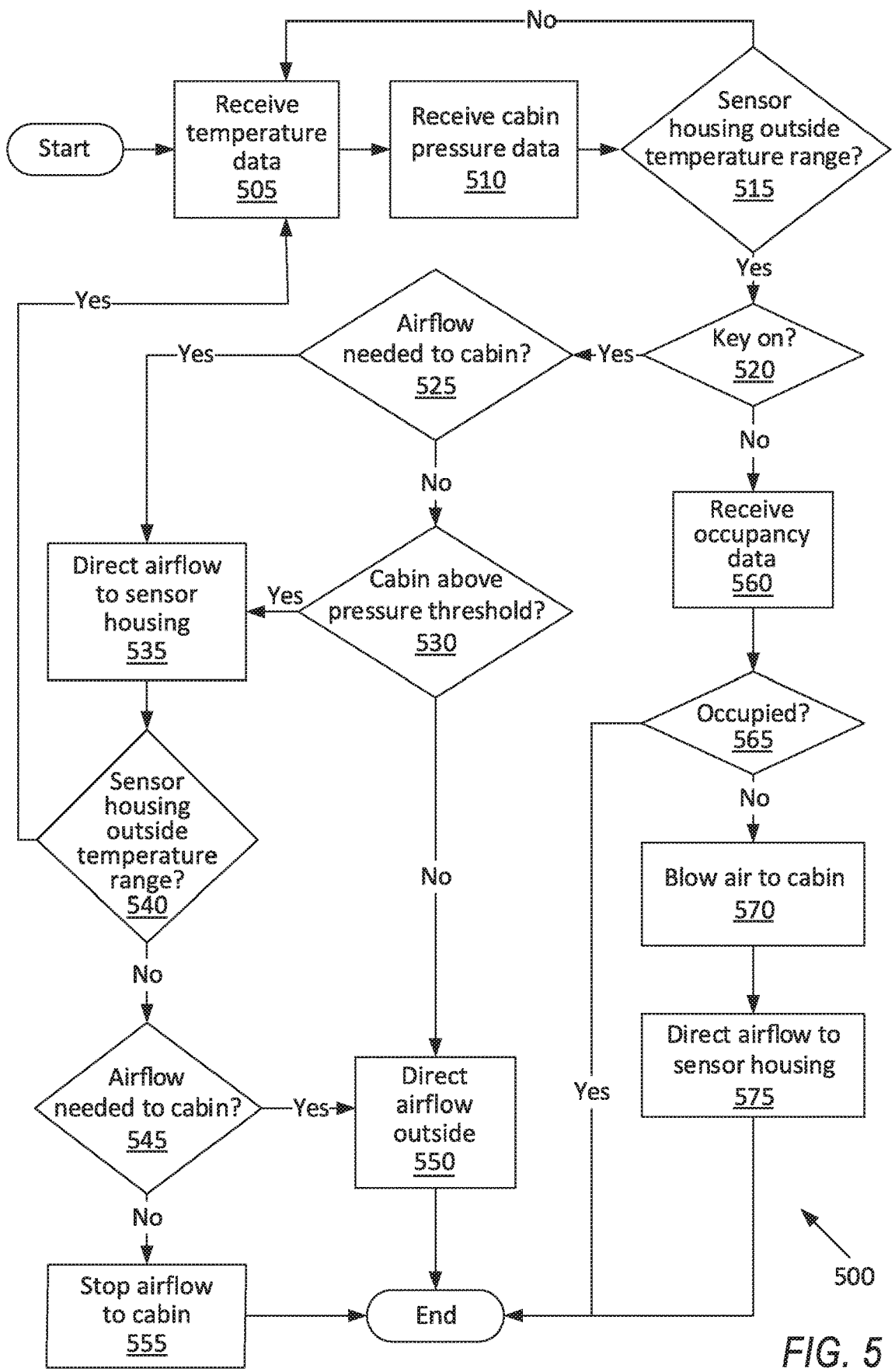
FIG. 5 is a process flow diagram of an example process for operating the cooling system of FIG. 1.

FIG. 5 is a process flow diagram illustrating an exemplary process 500 for controlling a temperature of the sensors 32. Generally, in the process 500, the controller 76 directs airflow from the passenger cabin 34 to the sensor 32 if the temperature of the sensor 32 is outside a temperature range (described below with respect to a block 515) and the passenger cabin 34 is able to provide the airflow, either from airflow into the passenger cabin 34 or a pressure of the passenger cabin 34, as described in more detail below. The memory of the controller 76 stores executable instructions for performing the steps of the process 500.

The process 500 begins in a block 505, in which the controller 76 receives temperature data from the temperature sensors 80 indicating a temperature of one of the sensors 32 in the chamber 58 and a temperature of the passenger cabin 34.

Next, in a block 510, the controller 76 receives pressure data from the pressure sensor 82 indicating a pressure, e.g., in MPa, of the passenger cabin 34.

Next, in a decision block 515, the controller 76 determines whether the temperature of the sensor 32 is outside a temperature range. The temperature range spans from a first temperature threshold down to a second temperature threshold. The first temperature threshold is higher than the second temperature threshold. (The adjectives "first" and "second" are used throughout this document as identifiers and are not intended to signify importance or order.) The first temperature threshold is chosen to be below a temperature at which the sensor 32 may overheat and/or malfunction. The second temperature threshold is chosen to be above a temperature at which the sensor 32 may malfunction or operate inefficiently or sluggishly from being too cold. The first and second temperature thresholds are also chosen to be sufficiently far apart that the valve 38 does not change positions too frequently, e.g., at a frequency that annoys occupants or causes the actuator 74 or valve 38 to wear out too quickly. Upon determining that the temperature of the sensor 32 is inside the temperature range, i.e., is below the first temperature threshold and above the second temperature threshold, the process 500 proceeds back to the block 505 to continue monitoring the temperature data and pressure data. Upon determining that the temperature of the sensor 32 is outside the temperature range, i.e., is above the first temperature threshold or below the second temperature threshold, the process 500 continues to a decision block 520.

In the decision block 520, the controller 76 receives data from an ignition of the vehicle 30 and determines whether the ignition is on or off. If the ignition is off, the process 500 proceeds to a block 560.

If the ignition is on, next, in a decision block 525, the controller 76 determines whether airflow is to be provided from the climate-control system 62 to the passenger cabin 34. The controller 76 may determine that airflow is to be provided based on whether an occupant of the passenger cabin 34 has entered a command to the climate-control system 62 for airflow to the passenger cabin 34. Alternatively or additionally, the controller 76 may determine whether the temperature of the passenger cabin 34 is greater than a threshold difference from a cabin temperature target. The threshold difference may be chosen to prevent the climate-control system 62 from activating and deactivating frequently enough to wear out too quickly or annoy occupants. The cabin temperature target may be set by a command from the occupant or may be a stored default value chosen to be comfortable to occupants. If airflow is to be provided to the passenger cabin 34, the climate-control system 62 provides the airflow, and the process 500 proceeds to a block 535.

If airflow is not to be provided to the passenger cabin 34, next, in a decision block 530, the controller 76 determines whether the pressure of the passenger cabin 34 is above a pressure threshold. The pressure threshold is chosen so that a sufficient pressure difference exists between the passenger cabin 34 and outside the vehicle 30 that more than a negligible amount of airflow would occur through the duct 36. If the pressure of the passenger cabin 34 is below the pressure threshold, the process 500 proceeds to a block 550.

Next, if the pressure of the passenger cabin 34 is above the pressure threshold, or after the decision block 525 if airflow is to be provided to the passenger cabin 34, in the block 535, the controller 76 instructs the actuator 74 to move the valve 38 to the first position, thus directing airflow through the duct 36 to the housing 56, specifically at the sensor 32 in the chamber 58 of the housing 56. The airflow is caused either by airflow from the climate-control system 62 into the passenger cabin 34 or by the difference in pressure between the passenger cabin 34 and the housing 56.

Next, in a decision block 540, the controller 76 determines whether the temperature of the sensor 32 is outside a temperature range, as described above with respect to the decision block 515. If the controller 76 determines that the temperature of the sensor 32 is still outside the temperature range, the process 500 returns to the block 505 to continue directing airflow to the sensor 32 until the temperature of the sensor 32 is inside the temperature range.

Next, if the controller 76 determines that the temperature of the sensor 32 is inside (i.e., within) the temperature range, in a decision block 545, the controller 76 determines whether airflow is to be provided from the climate-control system 62 to the passenger cabin 34, as described above with respect to the decision block 525. If airflow is not to be provided to the passenger cabin 34, the process proceeds to a block 555.

Next, if airflow is to be provided to the passenger cabin 34, or after the decision block 530 if the pressure of the passenger cabin 34 is below the pressure threshold, in a block 550, the controller 76 instructs the actuator 74 to move the valve 38 to the second position, thus directing the airflow through the duct 36 to outside the vehicle 30. The airflow is caused either by airflow from the climate-control system 62 into the passenger cabin 34 or by the difference in pressure between the passenger cabin 34 and outside the vehicle 30. After the block 550, the process 500 ends.

After the decision block 545, if airflow is not to be provided to the passenger cabin 34, the controller 76 instructs the climate-control system 62 to stop directing airflow to the passenger cabin 34. After the block 555, the process 500 ends.

After the decision block 520, if the ignition is off, the controller 76 receives occupancy data from the occupancy sensors 84. The format of the occupancy data depends on the type of the occupancy sensor 84. For example, if the occupancy sensors 84 are cameras, the occupancy data may be image data. For another example, if the occupancy sensors 84 are weight sensors, the occupancy data may be data indicating weights for each seat. For a third example, if the occupancy sensors 84 detect whether the seatbelts are buckled, the occupancy data may be a binary signal for each seat indicating whether the seatbelt is buckled.

Next, in a decision block 565, the controller 76 determines whether the passenger cabin 34 is occupied, i.e., whether at least one occupant is in the passenger cabin 34. For example, if the occupancy data are images, the controller 76 may use known object-detection algorithms to determine whether an occupant is sitting in at least one seat. For another example, if the occupancy data are weights for the seats, the controller 76 may determine whether the weight for any of the seats is above a weight threshold, which may be chosen so that, e.g., 95% of occupants would exceed the weight threshold. For a third example, if the occupancy data are binary signals for the buckles, the controller 76 may determine whether at least one of the binary signals indicates that a seatbelt is buckled. If the passenger cabin 34 is occupied, the process 500 ends.

Next, if the passenger cabin 34 is unoccupied, in a block 570, the controller 76 directs the climate-control system 62 to blow air to the passenger cabin 34.

Next, in a block 575, the controller 76 instructs the actuator 74 to move the valve 38 to the first position, thus directing airflow through the duct 36 to the housing 56, as described above with respect to the block 535. After the block 575, the process 500 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
an exterior surface;
a sensor disposed on the exterior surface;
a passenger cabin fixed relative to the exterior surface;
a duct receiving airflow downstream from the passenger cabin; and
a valve disposed in the duct and movable between a first position directing the airflow to the sensor and a second position directing the airflow away from the passenger cabin and outside the vehicle.

2. The vehicle of claim 1, wherein the exterior surface is a roof.

3. The vehicle of claim 2, further comprising a housing attached to the roof, wherein the housing defines a chamber, and the sensor is disposed in the chamber.

4. The vehicle of claim 3, wherein the duct extends from the valve to the chamber.

5. The vehicle of claim 1, further comprising an actuator movingly coupled to the valve, and a controller communicatively connected to the actuator.

6. The vehicle of claim 5, wherein the controller is programmed to instruct the actuator to move the valve to the first position upon determining that a temperature of the sensor is one of above and below a temperature threshold.

7. The vehicle of claim 6, wherein the controller is programmed to instruct the actuator to move the valve to the second position upon determining that the temperature of the sensor is the other of above and below the temperature threshold.

8. The vehicle of claim 5, wherein the controller is programmed to instruct the actuator to move the valve to the first position upon determining that a temperature of the sensor is outside a temperature range.

9. The vehicle of claim 8, wherein the controller is programmed to instruct the actuator to move the valve to the second position upon determining that a temperature of the sensor is inside the temperature range.

10. The vehicle of claim 5, wherein the controller is programmed to instruct the actuator to move the valve to the first position upon determining that a temperature of the sensor is one of above and below a temperature threshold and that a pressure of the passenger cabin is above a pressure threshold.

11. The vehicle of claim 5, wherein the controller is programmed to instruct the actuator to move the valve to the first position upon determining that a temperature of the sensor is one of above and below a temperature threshold and that an ignition of the vehicle is off.

12. The vehicle of claim 5, wherein the controller is programmed to instruct the actuator to move the valve to the first position upon determining that a temperature of the sensor is one of above and below a temperature threshold and that the passenger cabin is unoccupied.

13. A controller comprising a processor, the processor programmed to:
    instruct an actuator to move a valve of a vehicle to a first position upon determining that a temperature of a sensor is one of above and below a temperature threshold and that a pressure of the passenger cabin is above a pressure threshold, wherein the sensor is disposed on an exterior surface of the vehicle, and the valve is movable between the first position directing airflow from a passenger cabin of the vehicle to the sensor and a second position directing the airflow outside the vehicle.

14. The controller of claim 13, wherein the controller is programmed to instruct the actuator to move the valve to the second position upon determining that the temperature of the sensor is the other of above and below the temperature threshold.

15. The controller of claim 13, wherein the temperature threshold is a first temperature threshold, the controller is programmed to instruct the actuator to move the valve to the first position upon determining that the temperature of the sensor is above the first temperature threshold and to instruct the actuator to move the valve to the first position upon determining that the temperature of the sensor is below a second temperature threshold, and the first temperature threshold is higher than the second temperature threshold.

16. The controller of claim 15, wherein the controller is programmed to instruct the actuator to move the valve to the second position upon determining that the temperature of the sensor is below the first threshold temperature and above the second threshold temperature.

17. The controller of claim 13, wherein the controller is programmed to instruct the actuator to move the valve to the first position upon determining that the temperature of the sensor is one of above and below the temperature threshold and that an ignition of the vehicle is off.

18. The controller of claim 13, wherein the controller is programmed to instruct the actuator to move the valve to the first position upon determining that the temperature of the sensor is one of above and below the temperature threshold and that the passenger cabin is unoccupied.

19. A method comprising:
    instructing an actuator to move a valve of a vehicle to a first position upon determining that a temperature of a sensor is one of above and below a temperature threshold and that the passenger cabin is unoccupied, wherein the sensor is disposed on an exterior surface of the vehicle, and the valve is movable between the first position directing airflow from a passenger cabin of the vehicle to the sensor and a second position directing the airflow outside the vehicle.

\* \* \* \* \*